(12) United States Patent
Tso et al.

(10) Patent No.: US 8,898,854 B2
(45) Date of Patent: Dec. 2, 2014

(54) PLUG STORAGE STRUCTURE OF CLEANING ROBOT

(75) Inventors: Tse-Ying Tso, New Taipei (TW); You-Wei Teng, New Taipei (TW)

(73) Assignee: MSI Computer (Shenzhen) Co., Ltd., Shenzhen, Guangdong Province (CN)

(*) Notice: Subject to any disclaimer, the term of this patent is extended or adjusted under 35 U.S.C. 154(b) by 741 days.

(21) Appl. No.: 13/198,827

(22) Filed: Aug. 5, 2011

(65) Prior Publication Data

US 2012/0242279 A1 Sep. 27, 2012

(30) Foreign Application Priority Data

Mar. 23, 2011 (TW) ................................ 10205194 U

(51) Int. Cl.
*A47L 9/28* (2006.01)

(52) U.S. Cl.
CPC .............. *A47L 9/2873* (2013.01); *A47L 9/2868* (2013.01); *A47L 9/2852* (2013.01); *A47L 2201/00* (2013.01); *A47L 2201/022* (2013.01); *Y10S 15/01* (2013.01)
USPC ............ 15/319; 15/339; 15/340.1; 15/DIG. 1

(58) Field of Classification Search
CPC .. A47L 9/2842; A47L 9/2857; A47L 2201/00
USPC ............................ 15/319, 339, 340.1, DIG. 1
IPC ........................................ A47L 5/00, 9/00, 9/28
See application file for complete search history.

(56) References Cited

U.S. PATENT DOCUMENTS

| 7,053,578 | B2 * | 5/2006 | Diehl et al. ............... 318/568.12 |
| 2006/0080802 | A1 * | 4/2006 | Tani ................................ 15/319 |
| 2006/0212191 | A1 * | 9/2006 | Saeki ............................. 701/23 |
| 2007/0157416 | A1 * | 7/2007 | Lee et al. ........................ 15/319 |

FOREIGN PATENT DOCUMENTS

| CN | 2736835 Y | 10/2005 |
| CN | 201590006 U | 9/2010 |
| JP | 2004201493 A | * 7/2004 |

* cited by examiner

*Primary Examiner* — David Redding
(74) *Attorney, Agent, or Firm* — Morris Manning & Martin LLP; Tim Tingkang Xia, Esq.

(57) ABSTRACT

An plug storage structure of a cleaning robot is presented. A charging structure includes a charging base and a main body of an electronic device. The charging base includes a charging terminal and a projecting portion. The main body has an external housing, charging plugs and an plug storage device. When the main body reaches the charging base, the projecting portion triggers the plug storage device, so that the charging plugs protrude from the external housing, so as to be connected to the charging terminal. When the main body leaves the charging base, the plug storage device automatically receives the charging plugs inside the external housing, so as to keep the plugs of the cleaning robot received inside the external housing during cleaning, thereby preventing the plugs of the cleaning robot from colliding with and damaging adjacent furniture.

8 Claims, 10 Drawing Sheets

PLUG STORAGE STRUCTURE OF CLEANING ROBOT

CROSS-REFERENCE TO RELATED APPLICATIONS

This non-provisional application claims priority under 35 U.S.C. §119(a) on Patent Application No(s). 100205194 filed in Taiwan, R.O.C. on Mar. 23, 2011, the entire contents of which are hereby incorporated by reference.

BACKGROUND OF THE INVENTION

1. Field of the Invention

The present invention relates to a charging structure, and more particularly to a charging structure capable of automatically storage charging plugs.

2. Related Art

In order to provide a user with a more comfortable environment, many manufacturers actively provide different kinds of cleaning robots. When the user goes out to work, the cleaning robot is capable of automatically cleaning the home environment according to a schedule set by the user.

Since the cleaning robot comes back and forth the same place for several times during the cleaning process, most cleaning robots are designed without power cables. In other words, in order to enable the cleaning robot to move around the house more conveniently and to operate for a longer cleaning time, rechargeable batteries that can be charged repeatedly are disposed inside most cleaning robots. Generally speaking, the cleaning robot has a corresponding charging base in addition to the main body. When the cleaning robot finishes working or is low in battery power, the cleaning robot will automatically move towards the charging base. When the cleaning robot enters the charging base, charging plugs of the cleaning robot contact plugs of the charging base, and then the rechargeable battery is charged.

However, the charging plugs of the cleaning robot in the prior art cannot be received inside the cleaning robot. In other words, the charging plugs are exposed at the external housing of the cleaning robot all the time. Since the cleaning robot may contact various furniture or environments during the cleaning process, the charging plugs may contact wet objects. For example, when the charging plugs contact a wet obstacle (which may be a bucket or a beverage), the cleaning robot may be short-circuited. Or, when the cleaning robot collides with the furniture, the charging plugs may produce scratches on surfaces of the furniture. The charging plugs may deform due to the collision, so that the cleaning robot cannot be normally charged.

SUMMARY OF THE INVENTION

Accordingly, the present invention is a charging structure with an automatic storage function, configured to improve storage of charging plugs of an electronic device, so that the electronic device automatically protrudes the charging plugs when entering a charging base, and receives the charging plugs inside the electronic device when leaving the charging base.

The charging structure with an automatic storage function of the present invention comprises a charging base and a main body. The charging base further comprises a charging terminal and a projecting portion. The main body has an external housing, charging plugs, a deflector rod and a movable element. The deflector rod has a first end and a second end. The first end is connected to the charging plug. The movable element is connected to the first end and the external housing respectively. A pivot is further disposed between the first end and the second end. A first hole is disposed correspondingly between the charging terminal and the charging plug, and a second hole is disposed correspondingly between the projecting portion and the second end.

When the main body approaches the charging base, the projecting portion presses against the second end through the second hole, so as to enable the deflector rod to rotate around the pivot in a direction towards the external housing; and the first end protrudes the charging plug from the external housing through the first hole, so as to be connected to the charging terminal.

In addition, when the main body leaves the charging base, the movable element is compressed to push the deflector rod; and the first end of the deflector rod rotates around the pivot in a direction away from the external housing, so as to drive the charging plug to be received inside the external housing.

In addition to the above embodiment, the present invention further provides another embodiment, in which the second hole is disposed at a bottom of the external housing and corresponding to the projecting portion of the charging base, and the movable element is disposed on the pivot. The movable element may be a torsion spring or an extension spring. One end of the torsion spring presses against an outer side of the external housing, and the other end of the torsion spring is disposed at the second end of the deflector rod. When the main body enters the charging base, the projecting portion presses against the second end, so as to enable the first end to rotate around the pivot in a direction towards the external housing; and the first end protrudes the charging plug from the external housing through the first hole, so as to be connected to the charging terminal and compress the movable element. When the main body leaves the charging base, the movable element pushes the deflector rod, so as to enable the first end to rotate around the pivot in a direction away from the external housing, thereby storage the charging plug inside the external housing.

The present invention provides an electronic device capable of automatically storage the charging plugs, so that the charging plugs are pushed out only when the electronic device is connected to the charging base, thereby avoiding damages generated when the charging plugs are exposed.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1A:
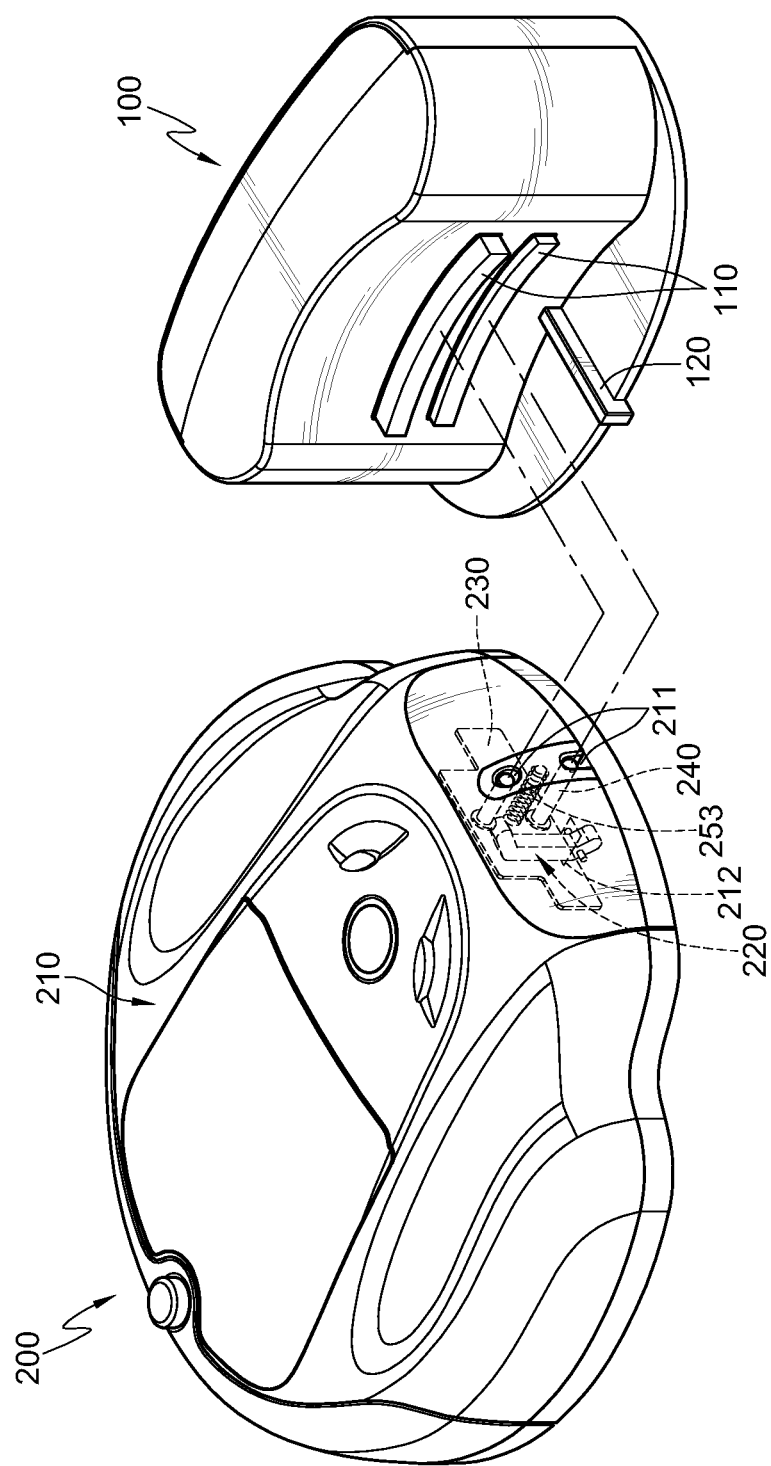
FIG. 1A is a three-dimensional view of the present invention.
Figure 1B:
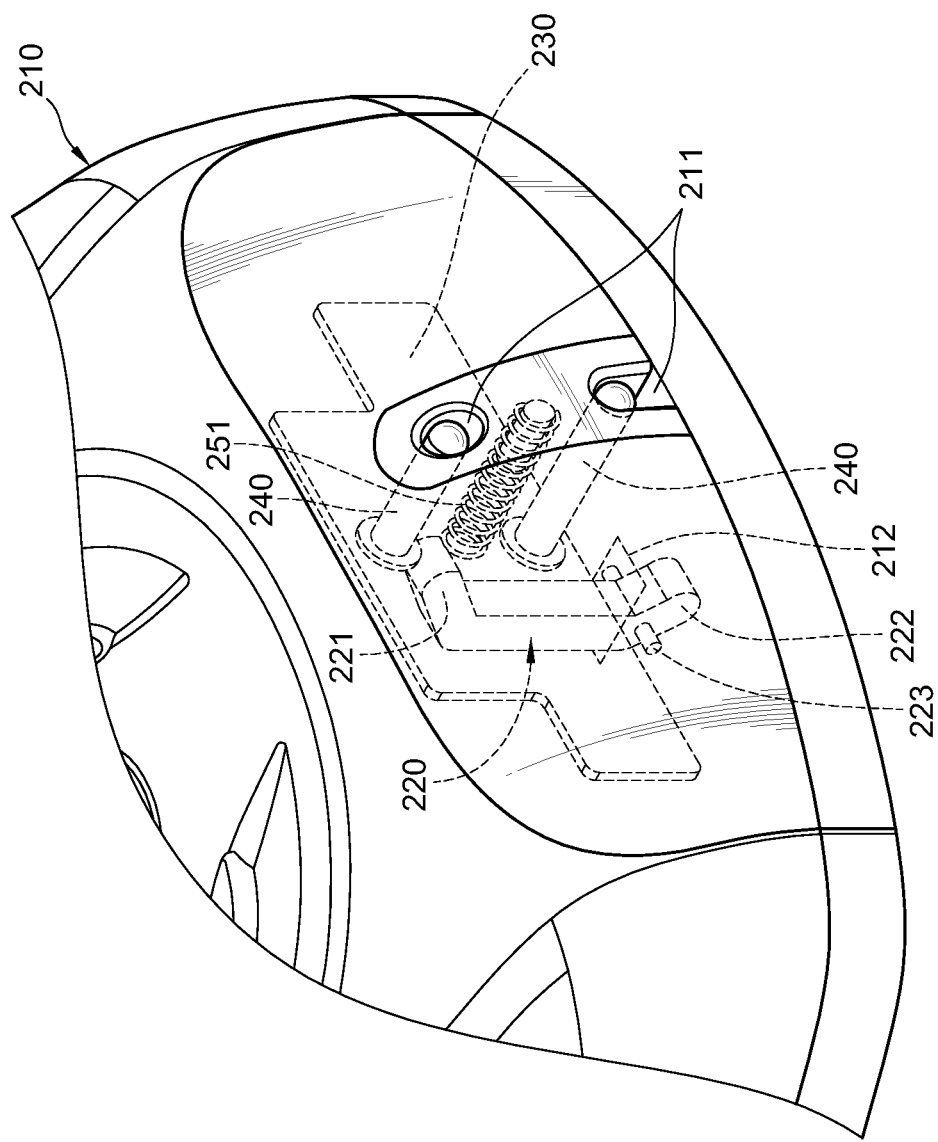
FIG. 1B is a partially enlarged three-dimensional view of a main body according to the present invention.

FIG. 1A is a three-dimensional view of the present invention, and FIG. 1B is a partially enlarged three-dimensional view of a main body according to the present invention. Referring to FIG. 1A and FIG. 1B, the present invention comprises a charging base 100 and a main body 200 of an electronic device (briefly referred to as a main body 200 hereinafter). The charging base 100 has a charging terminal 110 and a projecting portion 120. The electronic device may be, but not limited to, a cleaning robot, and the present invention may also be applied to an electronic device in which the main body 200 is separated from the charging base 100. The main body 200 has an external housing 210, a deflector rod 220, a circuit connecting board 230, charging plugs 240 and a movable element. The number of plugs of the charging terminal 110 may be determined according to the type of the rechargeable battery, but is not limited to the number of the plugs of this embodiment. Further, the number of the charging plug 240 is equal to that of the plugs of the charging terminal 110. The charging terminal 110 and the charging plug 240 may be implemented by an plug plate or an plug bar.

Two ends of the deflector rod 220 are respectively defined as a first end 221 and a second end 222. The deflector rod 220 may be implemented by a single connecting rod, or may be constituted by a combination of multiple connecting rods. The shape of the deflector rod 220 is not limited to a straight rod, and the first end 221 and the second end 222 may be bent in the same direction or different directions as shown in FIG. 1B. The deflector rod 220 with two bent ends may enable the charging plug 240 to move a longer distance inside the limited movement space of the external housing 210.

The first end 221 of the deflector rod 220 is connected to one side surface of the circuit connecting board 230, and the other side surface of the circuit connecting board 230 is connected to the charging plug 240. One end of the movable element is disposed at the circuit connecting board 230, as shown in FIG. 1B, and the other end of the movable element is disposed on an inner side of the external housing 210. The movable element may be an extension spring 251, a torsion spring 252 or multiple magnets 253. The movable element in this embodiment is, for example, an extension spring 251. A pivot 223 is disposed between the first end 221 and the second end 222 of the deflector rod 220, and the deflector rod 220 may rotate around the pivot 223, thereby forming a lever between the first end 221 and the second end 222.

The external housing 210 is further disposed with a first hole 211 and a second hole 212. The first hole 211 is disposed on the external housing 210 at a position corresponding to the charging plug 240 and the charging terminal 110, so as to enable the charging plug 240 to be correspondingly connected to the charging terminal 110 after protruding from the first hole 211. The number of the first hole 211 is equal to that of the charging plug 240, or the area of the first hole 211 comprises a range of the charging plug 240, so that the charging plug 240 may extend and retract through the first hole 211. In addition, the thickness of the first hole 211 of the external housing 210 may be increased, so as to form a tunnel for accommodating the charging plug 240. The second hole 212 is disposed on the external housing 210 at a position corresponding to the projecting portion 120.

Taking this embodiment as an example, the projecting portion 120 extends from a base portion of the charging base 100 (as shown in FIG. 1A). Therefore, the second hole 212 is also disposed at a bottom of the main body 200 to accommodate the second end 222. In order to prevent a foreign object from contacting the second end 222 during the movement of the main body 200, bumps 213 are disposed on two sides of the second end 222 corresponding to the external housing 210, and a space is formed between the two bumps 213 to enable the second end 222 to move and the projecting portion 120 to be accommodated. In addition, the bumps 213 may also be in other shapes, for example, in the shape of a cube, a cone or an ellipse.

Figure 2A:
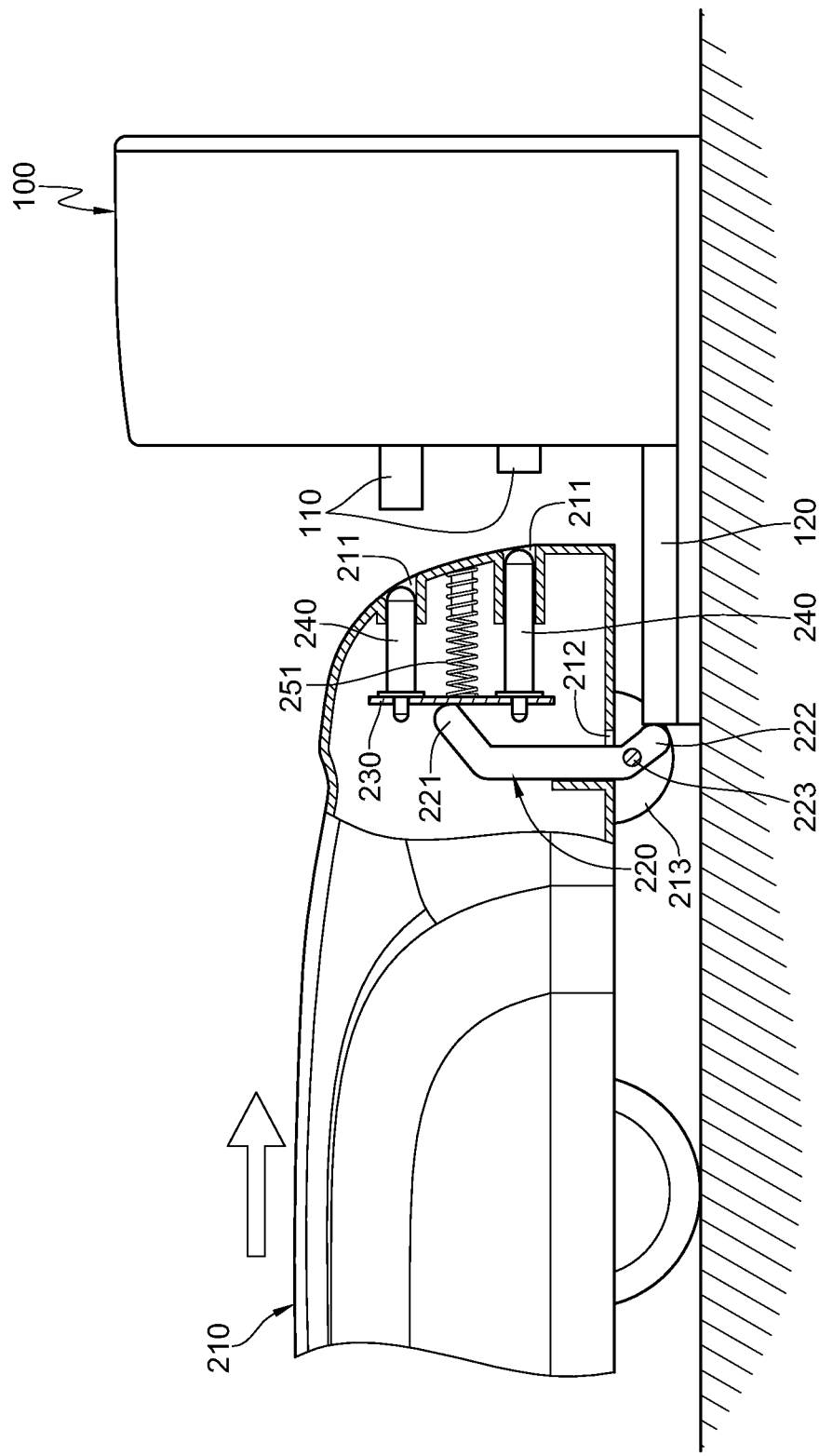
FIG. 2A is a side view when charging plugs do not protrude from a housing according to the present invention.

When the main body 200 needs to be charged, the main body 200 automatically moves to the charging base 100, and detects a position of the charging terminal 110 relative to the charging plug 240. A process that the main body 200 detects the charging base 100 is not covered in the protection scope of the present invention, so the detecting process will not be further described. After determining the position of the charging terminal 110 relative to the charging plug 240, the main body 200 moves towards the charging base 100. When the main body 200 enters the charging base 100, the projecting portion 120 of the charging base 100 presses against the second end 222 of the deflector rod 220, as shown in FIG. 2A, which is a side view of the present invention. The deflector rod 220 takes the pivot 223 as an axle center, so as to enable the second end 222 in FIG. 2A to rotate in a clockwise direction.

Figure 2B:
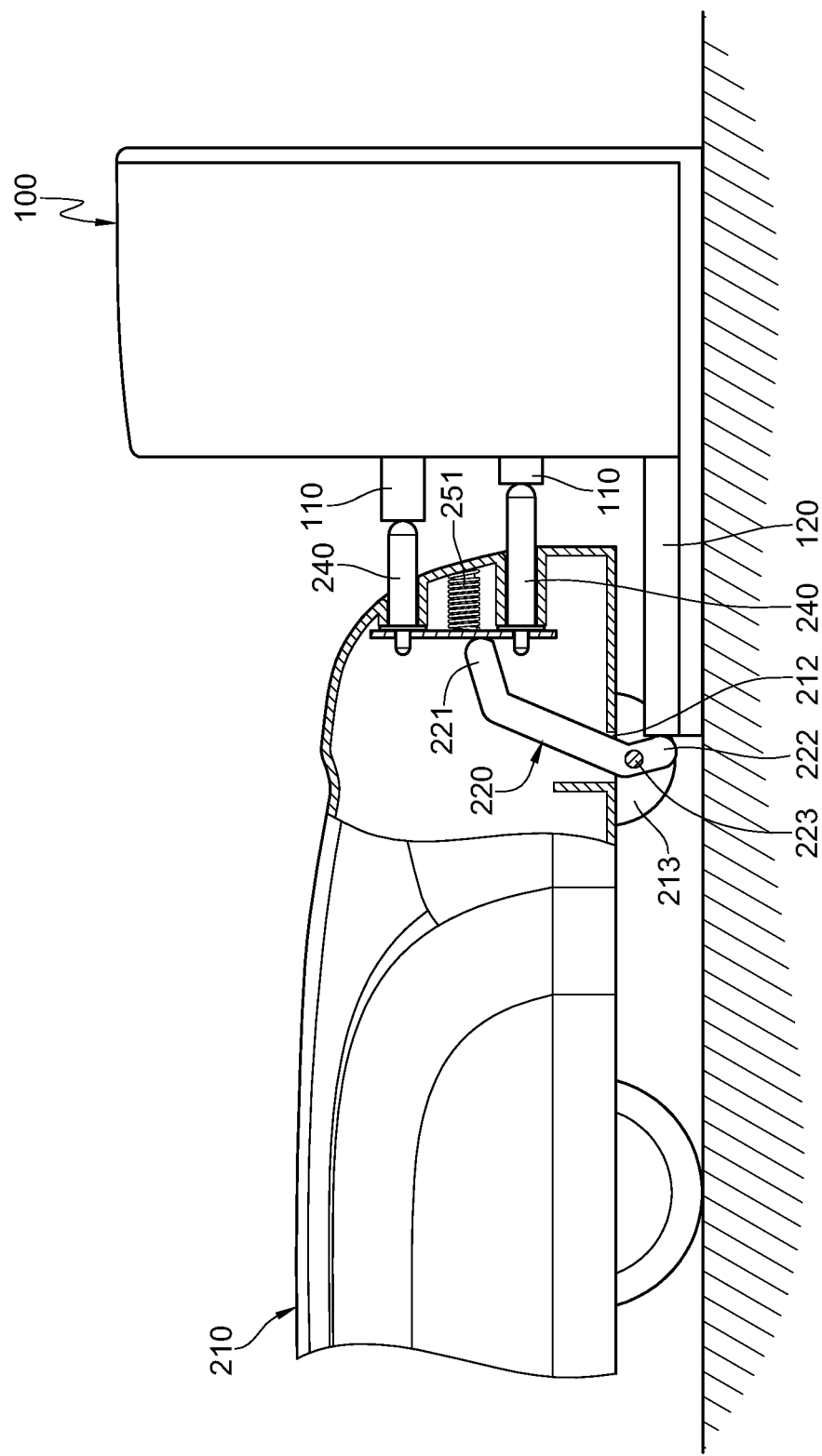
FIG. 2B is a side view when charging plugs protrude from a housing according to the present invention.

When the deflector rod 220 starts to rotate, the first end 221 is driven to move towards the charging base 100. Therefore, the first end 221 pushes the charging plug 240 of the circuit connecting board 230 outwards, so as to enable the charging plug 240 to protrude through the first hole 211 of the external housing 210, as shown in FIG. 2B. In addition, the movable element is compressed to generate a corresponding elastic force when the circuit connecting board 230 is pushed outwards. Therefore, when the main body 200 is separated from the charging base 100, the movable element pushes the circuit connecting board 230 inwards (that is, the second end 222 rotates in a counter-clockwise direction in FIG. 2B), and drives the first end 221 and the second end 222 of the deflector rod 220 to return to the original positions. In other words, when the main body 200 completely leaves the charging base 100, the deflector rod 220 is subjected to the elastic force of the movable element, so that the charging plug 240 is received inside the external housing 210.

Figure 3A:
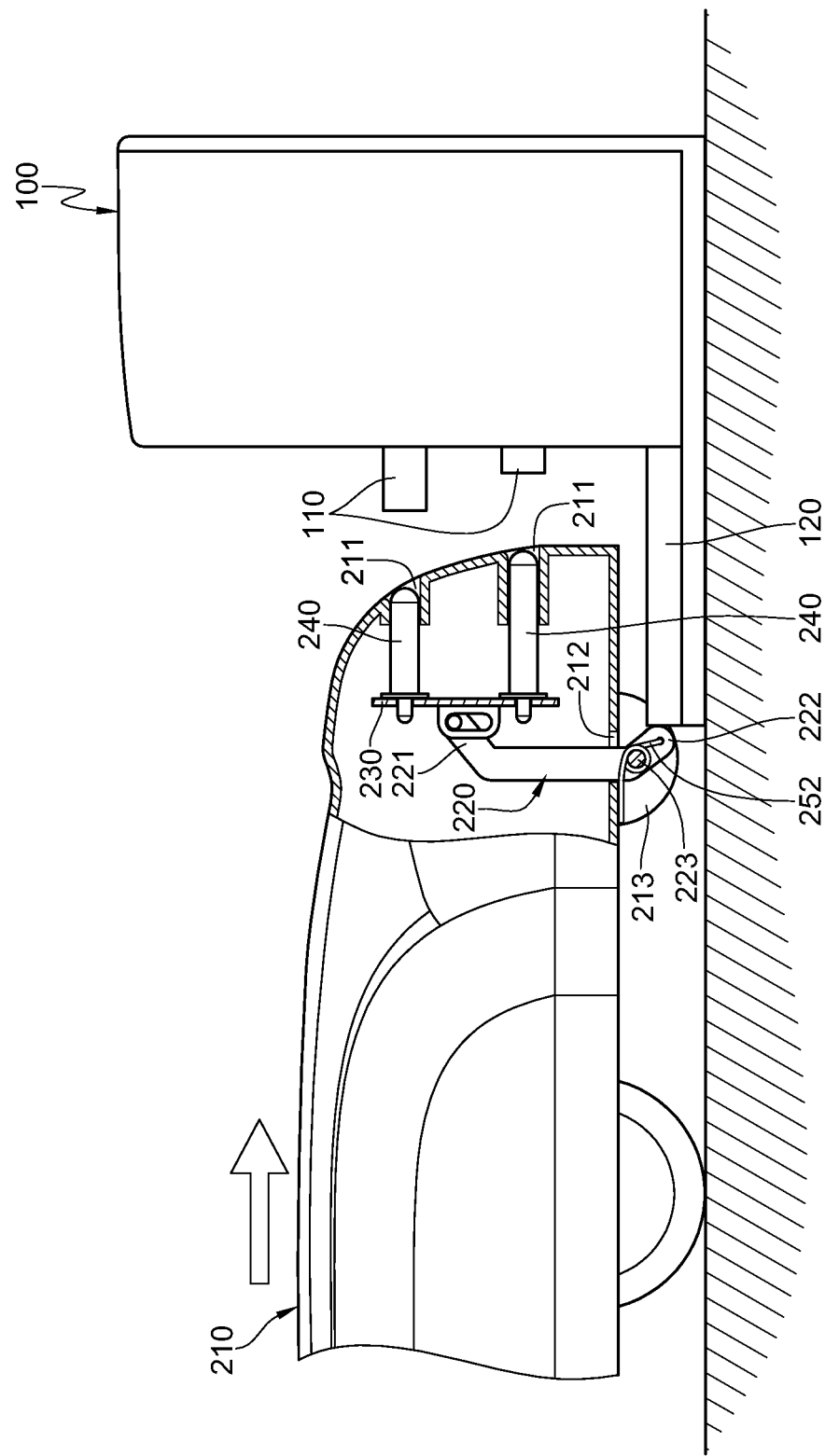
FIG. 3A is a schematic view before operation according to an embodiment of the present invention.
Figure 3B:
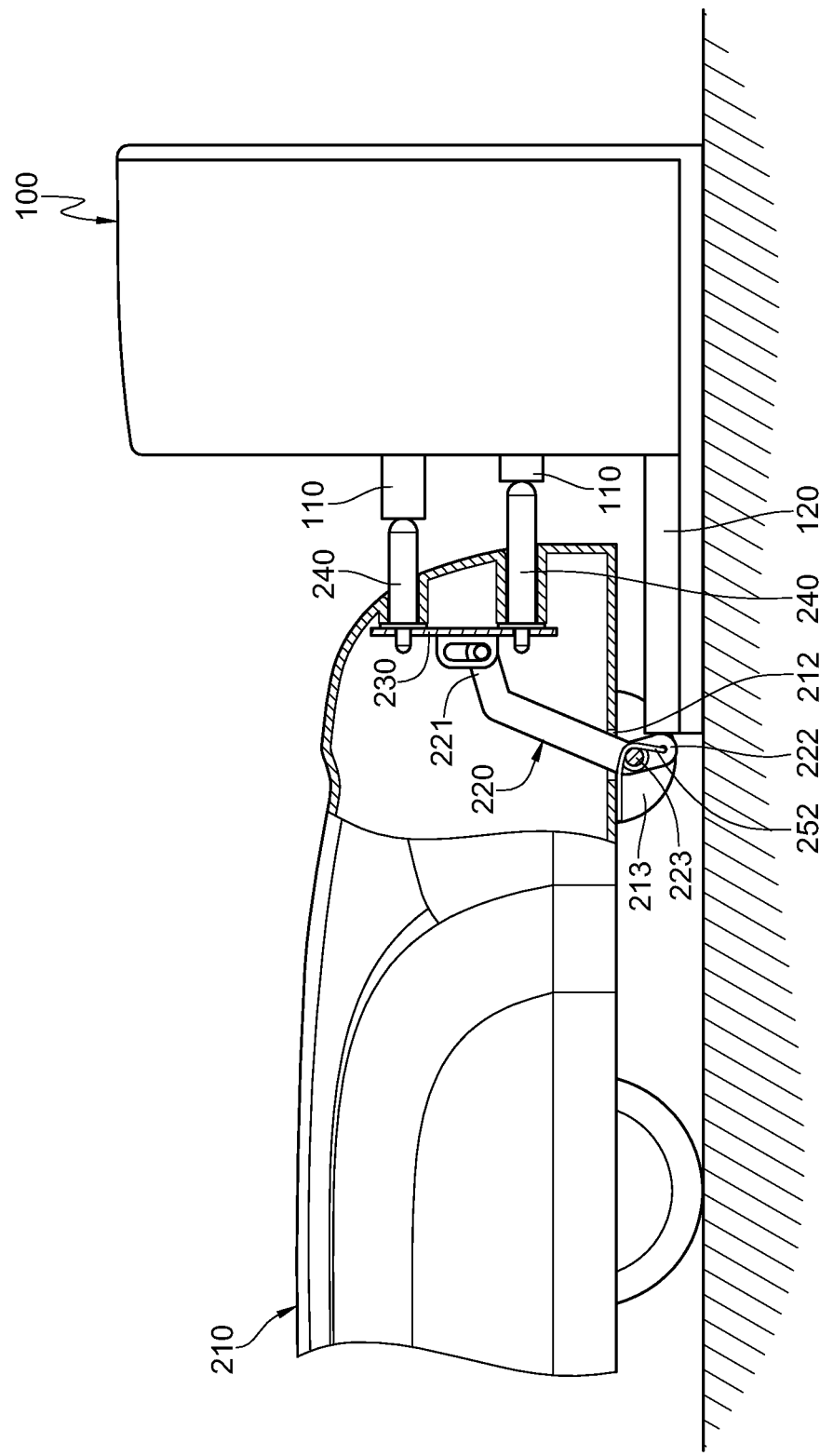
FIG. 3B is a schematic view after operation according to an embodiment of the present invention.

In addition to the above manner of disposing the movable element, different movable elements may be disposed at different positions in the present invention. FIG. 3A and FIG. 3B are respectively schematic views illustrating operation of this embodiment. In this embodiment, the second hole 212 is disposed at a bottom of the external housing 210, the second end 222 of the deflector rod 220 is exposed at the bottom of the external housing 210, and the movable element is a torsion spring 252. The pivot 223 is disposed at the second hole 212 and aligned with the deflector rod 220. One end of the torsion spring 252 presses against the bottom of the external housing 210, and the other end of the torsion spring 252 is connected to the second end 222 of the deflector rod 220. The circuit connecting board 230 is further disposed with a sliding way, and the first end 221 of the deflector rod 220 is disposed inside the sliding way, so as to enable the first end 221 to move in the sliding way.

When the main body 200 enters the charging base 100, the projecting portion 120 presses against the second end 222, so as to enable the first end 221 to rotate around the pivot 223 in a direction towards the external housing 210; and the first end 221 protrudes the charging plug 240 from the external housing 210 through the first hole 211, so as to be connected to the charging terminal 110 and compress the movable element. Since the deflector rod 220 drives the circuit connecting board 230 to move towards the charging base 100, the first end 221 moves from one end to the other end of the sliding way (as shown in FIG. 3B). When the main body 200 leaves the charging base 100, the torsion spring 252 pushes the second end 222 of the deflector rod 220 to the original position, so as to enable the first end 221 to rotate around the pivot 223, and to drive the first end 221 to rotate in a direction away from the charging base 100, thereby storage the charging plug 240 inside the external housing 210.

Figure 4A:
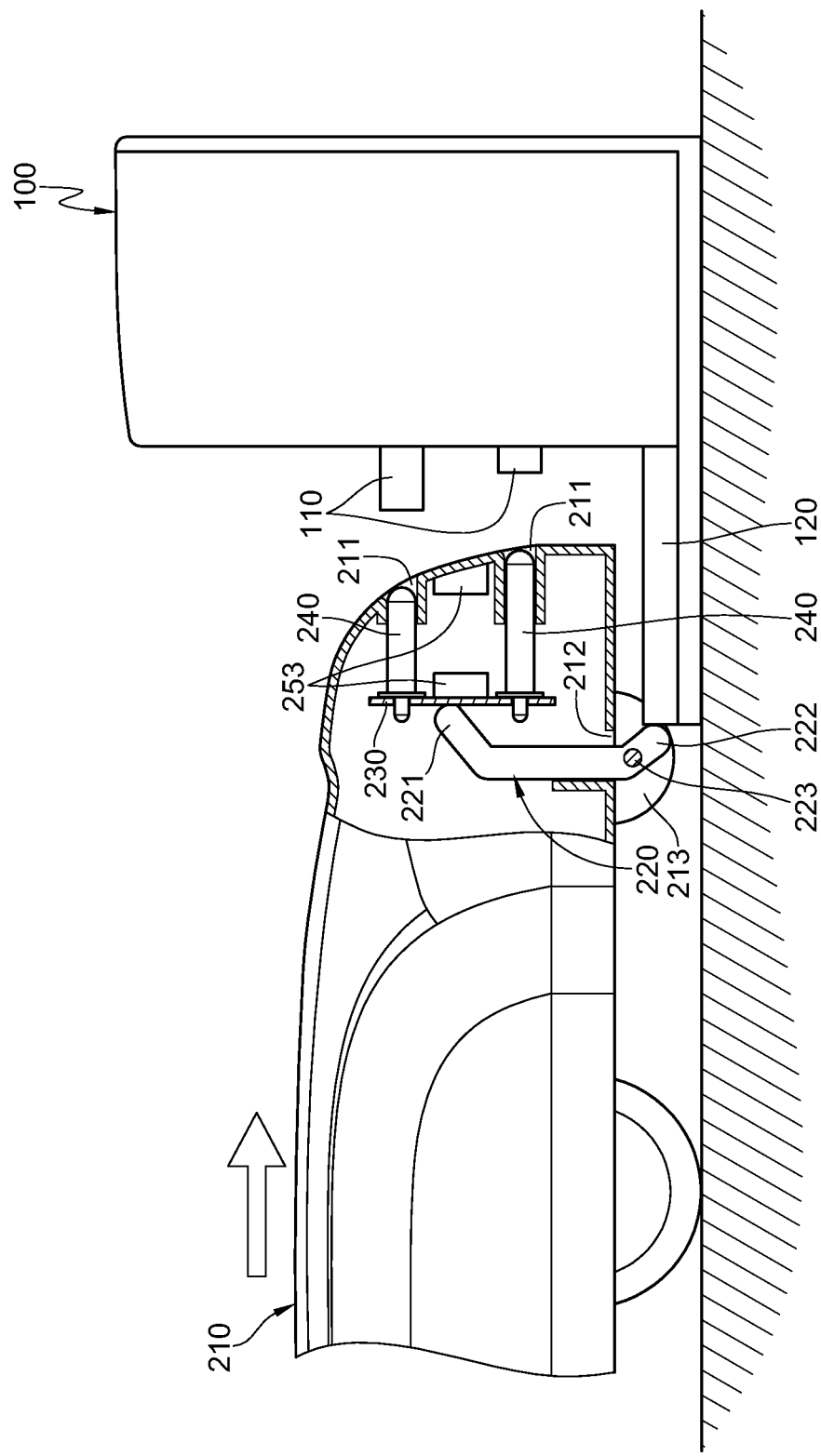
FIG. 4A is a schematic view before operation according to another embodiment of the present invention.
Figure 4B:
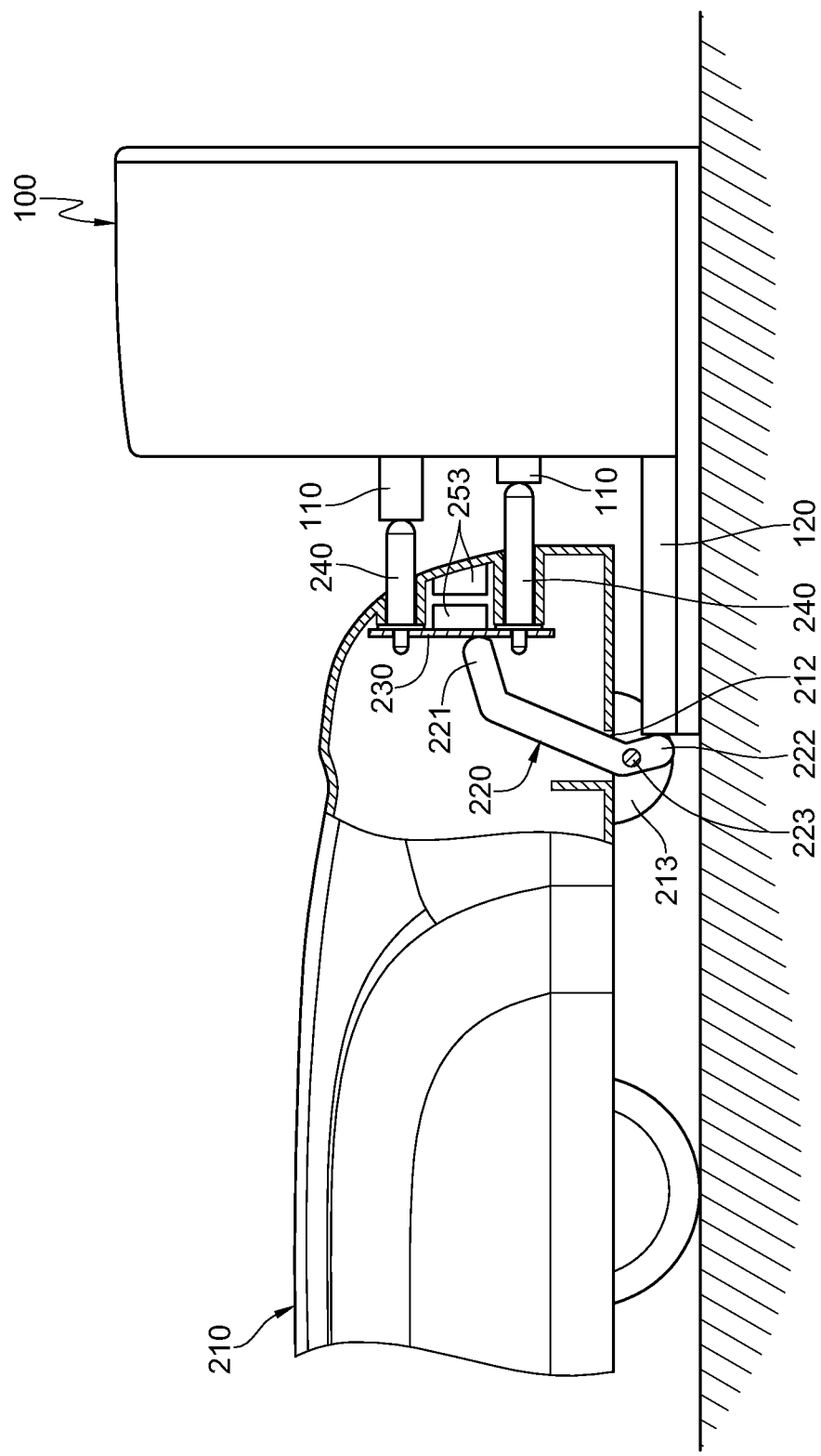
FIG. 4B is a schematic view after operation according to another embodiment of the present invention.

In addition to the extension spring 251, the movable element may also be magnets 253 with the same polarity disposed at corresponding positions on the external housing 210 and the circuit connecting board 230, as shown in FIG. 4A and FIG. 4B. When the second end 222 is pressed against by the projecting portion 120, the first end 221 pushes the magnet 253 towards the magnet 253 of the external housing 210. Since the magnets 253 have the same polarity and repel each other, a repulsion force is generated between the circuit connecting board 230 and the external housing 210. When the projecting portion 120 does not press against the second end 222, the circuit connecting board 230 drives the deflector rod 220 to return to the original position from the current position due to the repulsion force generated by the movable element, that is, the charging plug 240 is received inside the external housing 210.

Figure 5A:
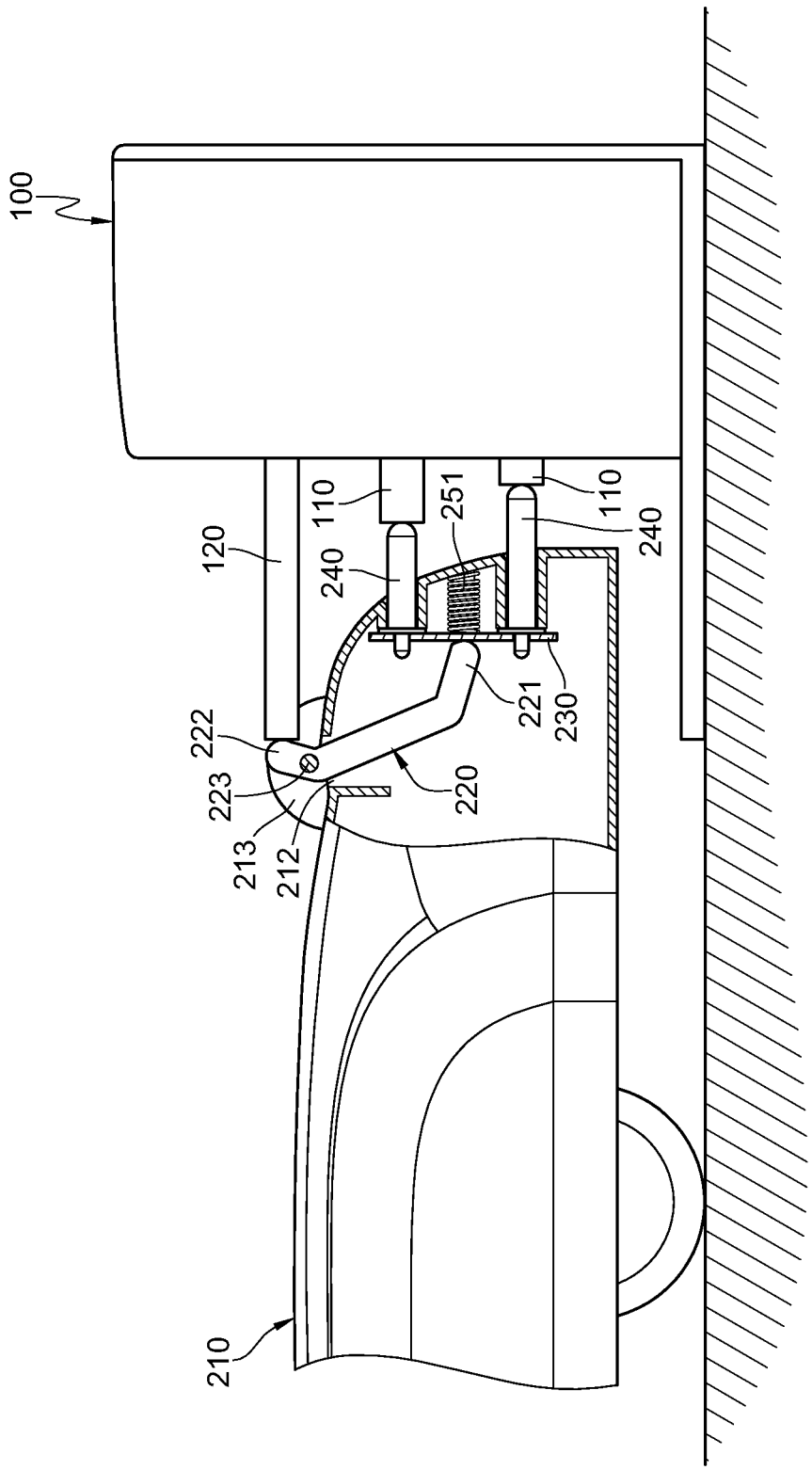
FIG. 5A is a schematic view of disposing a second hole at a top of an external housing according to the present invention.
Figure 5B:
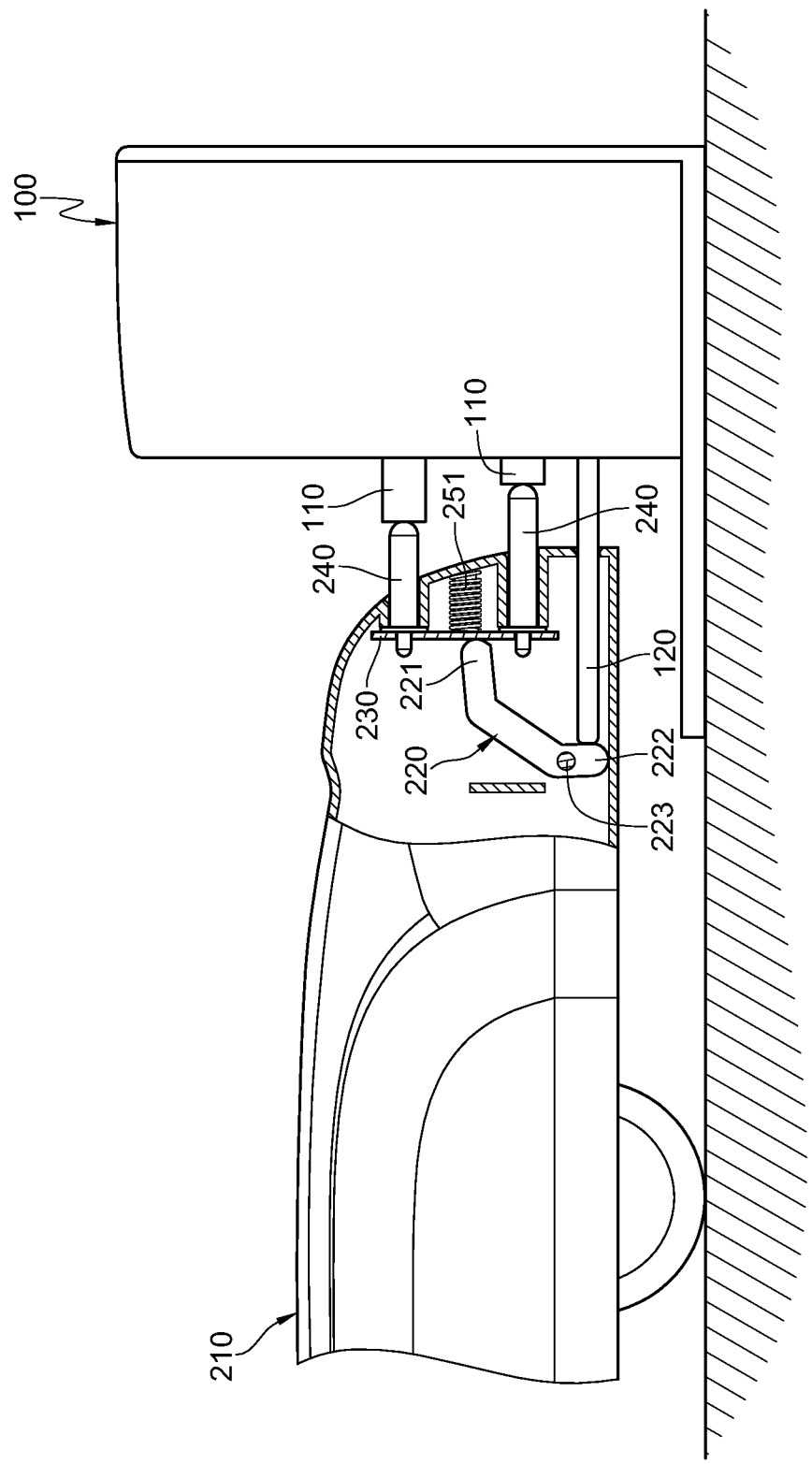
FIG. 5B is a schematic view of disposing a second hole at a side edge of an external housing according to the present invention.

In this embodiment, since the projecting portion 120 is disposed at the bottom of the charging base 100, and the second end 222 of the deflector rod 220 is disposed on the outer side of the external housing 210, the second hole 212 is disposed at the bottom of the external housing 210. The second hole 212 may also be disposed at a top or a side edge of the external housing 210, as shown in FIG. 5A and FIG. 5B.

The present invention provides an electronic device capable of automatically storage the charging plugs 240, so that the charging plugs 240 are pushed out only when the electronic device is connected to the charging base 100, thereby avoiding possible damages to the main body 200 or other objects when the charging plugs 240 are exposed.

What is claimed is:

1. A plug storage structure of a cleaning robot, configured to improve storage of at least one charging plug of an electronic device, the plug storage structure comprising:
   a charging base, comprising a charging terminal and a projecting portion; and
   a main body, having an external housing, the at least one charging plug, a deflector rod and a movable element, wherein the external housing is further disposed with a first hole and a second hole, the deflector rod has a first end and a second end, the first end is connected to the at least one charging plug, the movable element is connected to the first end and the external housing respectively, a pivot is further disposed between the first end and the second end, the first hole is disposed correspondingly between the charging terminal and the at least one charging plug, and the second hole is disposed correspondingly between the projecting portion and the second end;
   wherein the projecting portion presses against the second end through the second hole, so as to enable the first end to rotate around the pivot in a direction towards the external housing, the first end protrudes the at least one charging plug from the external housing through the first hole, so as to be connected to the charging terminal, and when the main body leaves the charging base, the movable element pushes the deflector rod, so as to enable the first end to rotate around the pivot in a direction away from the external housing, thereby storage the at least one charging plug inside the external housing.

2. The plug storage structure of the cleaning robot according to claim 1, wherein the number of the first hole or the second hole is equal to that of the charging terminal or the at least one charging plug.

3. The plug storage structure of the cleaning robot according to claim 1, wherein the second end is disposed on an outer side of the external housing.

4. The plug storage structure of the cleaning robot according to claim 1, wherein the main body is further disposed with at least one bump, and the bumps are respectively disposed beside the second end of the deflector rod, so as to enable the deflector rod to move in a space formed by the bumps.

5. The plug storage structure of the cleaning robot according to claim 1, wherein the movable element is an extension spring, a torsion spring or a magnet.

6. The plug storage structure of the cleaning robot according to claim 1, wherein the main body further comprises a circuit connecting board, the first end is connected to one side surface of the circuit connecting board, and the other side surface of the circuit connecting board is connected to the at least one charging plug and the movable element respectively.

7. A plug storage structure of a cleaning robot, configured to improve storage of at least one charging plug of an electronic device, the plug storage structure comprising:
   a charging base, comprising a charging terminal and a projecting portion; and
   a main body, having an external housing, the at least one charging plug, a deflector rod and a movable element, wherein the external housing is further disposed with a first hole and a second hole, the deflector rod has a first end and a second end, the first hole is disposed correspondingly between the charging terminal and the at least one charging plug, the second hole is disposed at a bottom of the external housing, the first end is connected to the at least one charging plug, the deflector rod is further disposed with a pivot at the external housing, the movable element is disposed on the pivot, one end of the movable element presses against an outer side of the external housing, and the other end of the movable element is connected to the second end;
   wherein the projecting portion presses against the second end, so as to enable the first end to rotate around the pivot in a direction towards the external housing, the first end protrudes the at least one charging plug from the external housing through the first hole, so as to be connected to the charging terminal and compress the movable element, and when the main body leaves the charging base, the movable element pushes the deflector rod, so as to enable the first end to rotate around the pivot in a direction away from the external housing, thereby storage the at least one charging plug inside the external housing.

8. The plug storage structure of the cleaning robot according to claim 7, wherein the movable element is an extension spring or a torsion spring.

* * * * *